UNITED STATES PATENT OFFICE.

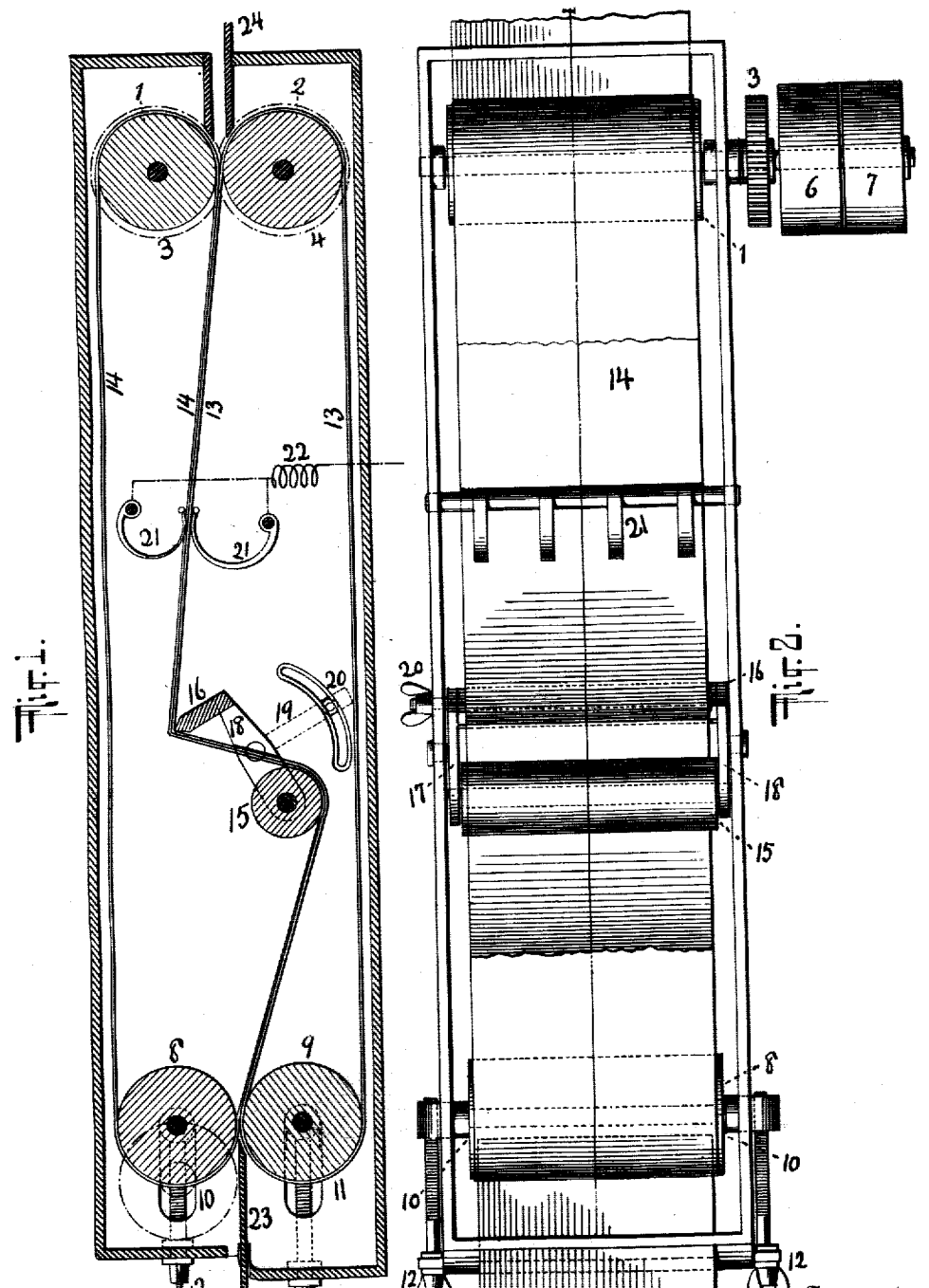

CHARLES H. BRIGHAM, OF NEW YORK, N. Y., AND GEORGE P. HARVEY, OF JERSEY CITY, NEW JERSEY.

MACHINE FOR PREPARING COATED MATERIALS.

No. 814,351.  Specification of Letters Patent.  Patented March 6, 1906.

Application filed March 15, 1904. Serial No. 198,236.

*To all whom it may concern:*

Be it known that we, CHARLES H. BRIGHAM, residing at No. 104 West Ninety-fourth street, in the city and State of New York, and GEORGE P. HARVEY, residing at No. 446 Westside avenue, in Jersey City, in the State of New Jersey, citizens of the United States, have invented a new and useful Machine for Preparing Coated Materials, of which the following is a specification.

Our invention relates to a machine for preparing, manipulating, or modifying those manufactures consisting of a thin material having a surface covered by a substance or film adhering thereto or formed in part by treating the material to which it adheres—such as gummed paper, court-plaster, and analogous articles; and the objects of our invention are to provide a machine which will practically prevent the contraction of the film or substance adhering to the surface of such materials, and thus do away with the tendency of such manufactures to curl, enable the use of a substance or film heavier in proportion to the material, and provide articles of this character more easily handled and more useful. We obtain these objects by the mechanism illustrated in the accompanying drawings, in which—

Figure 1 is a longitudinal section of the box in which the mechanism is contained, showing the mechanism. Fig. 2 is a horizontal section of the same.

Similar figures refer to similar parts throughout both views.

1 and 2 are rollers of equal size, the bearings of which are held by the box.

3 and 4 are spur-wheels connecting the rollers 1 and 2 and engaging each other, so that the rollers revolve equally in opposite directions. The roller 1 is connected with the usual wheels 6 and 7, over which passes the belt by which the mechanism is driven, or the mechanism may be driven by hand by furnishing a handle connected with the roller 1.

8 and 9 are similar rollers running in bearings fixed to the box, preferably adjustable in the usual way, so as to take up the slack as the belts 13 and 14, which pass over them, may stretch. The adjustable bearings of the rollers 8 and 9 are shown at 10, 11, and 12. Over the rollers 2 and 9 passes an endless belt of linen or other thin material 13, and a similar belt 14 passes over the rollers 1 and 8.

15 is an idle roller extending almost across the box.

16 is a bar parallel to the roller 15 and having its ends connected with the axes of the roller 15 by bars 17 and 18, which are pivoted or centered on the sides of the box. From one of these bars 17 extends an arm 19, provided with a screw or clamp 20, engaging the side of the box, which enables the bars 17 and 18 to be moved upon their pivots and held in any desired position. This movement of the bars 17 and 18 is desirable in order to increase or diminish the tension and the angle at which the belts 13 and 14 pass over the bar 16. The two belts 13 and 14 pass together under the idle roller 15 and over the bar 16, the edge of which is somewhat sharpened along the line of contact, the exact degree of sharpness depending chiefly upon the thickness of the film or substance adhering to the material and of the material itself.

21 represents the usual brushes, of metal, connected with a grounded wire 22, designed merely to remove the electricity that may be generated by the operation of the mechanism.

23 is a feed-table running into the box for the purpose of allowing the material to be fed into the mechanism, and 24 is a table upon which the material is received after passing through the mechanism.

The operation of the mechanism is as follows: The rollers 1 and 2 revolve equally in opposite directions, causing the endless belts 13 and 14 to travel equally. The material—as, for example, a piece of gummed paper in the form now usually produced—is fed into the mechanism from the table 23. It is caught and lightly held above and below by the endless belts 13 and 14, between which it rests. The material is inserted so that the substance or film covering the surface is uppermost in order that when it reaches the edge of the bar 16 it may be more effectually broken. Passing along between the belts which carry and protect it the material is drawn under the roller 15, and thence across and bent over the edge of the bar 16, which fractures or breaks the substance or film adhering to the surface of the material into numerous small particles, and then, still held by the belts, the material passes out at the other end of the box onto the table 24.

What we claim as our invention, and desire to secure by Letters Patent of the United States, is—

1. A machine for breaking into small particles the substance or film covering a surface of those materials which consist of a thin material having a surface covered by a substance or film adhering thereto or formed in part by treating the material to which it adheres, which consists of a suitable frame, two belts which hold the material between them, and means intermediate the ends of the frame to break the gum or film into small particles, leaving it adhering to the material.

2. A machine for breaking into small particles the substance or film covering a surface of those materials which consist of a thin material having a surface covered by a substance or film adhering thereto or formed in part by a suitable frame, two endless belts within the frame which belts hold the material between them, rollers for supporting said belts and means intermediate of the supporting-rollers provided with an edge adapted to break the gum or film into small particles, leaving it adhering to the material.

3. In a machine for preparing gummed paper, court-plaster and other manufactures, consisting of a thin material having a surface covered by a substance or film adhering thereto or formed in part by treating the material to which it adheres, the combination of a frame, two endless belts within the frame so arranged as to hold the material between them and an edge adapted to break the film into small particles leaving it adhering to the material.

4. A machine for breaking into small particles the substance or film covering a surface of those materials which consist of a thin material having a surface covered by a substance or film adhering thereto or formed in part by treating the material to which it adheres, such as gummed paper, court-plaster and analogous manufactures, which consists of a suitable frame, an edge, two belts which hold the material between them and thus draw it over the edge.

5. In a machine for preparing gummed paper, court-plaster and other manufactures consisting of a thin material having a surface covered by a substance or film adhering thereto or formed in part by treating the material to which it adheres, a combination of two endless belts to hold and break the material with an edge across which the material is bent at an angle.

6. In a machine for preparing gummed paper, court-plaster and other manufactures consisting of a thin material having a surface covered by a substance or film adhering thereto or formed in part by treating the material to which it adheres, a combination of two endless belts to hold the material, a roller and edge so arranged that the belts draw the material over the roller and bend it across the edge so that the adhering substance or film is broken or fractured.

In testimony whereof we have signed our names to this specification in the presence of two subscribing witnesses.

CHAS. H. BRIGHAM.
GEO. P. HARVEY.

Witnesses:
HERMAN GUSTOW,
FREDERICK BEAVER.